(12) United States Patent
Wang

(10) Patent No.: US 8,019,543 B2
(45) Date of Patent: Sep. 13, 2011

(54) METHODS FOR DETERMINING AN INITIAL AINS HEADING

(75) Inventor: Jau-Hsiung Wang, Aurora (CA)

(73) Assignee: Applanix Corporation Inc., Richmond Hills, Ontario (CA)

(*) Notice: Subject to any disclaimer, the term of this patent is extended or adjusted under 35 U.S.C. 154(b) by 740 days.

(21) Appl. No.: 12/215,617

(22) Filed: Jun. 27, 2008

(65) Prior Publication Data

US 2009/0326740 A1  Dec. 31, 2009

(51) Int. Cl.
*G01C 23/00* (2006.01)
*G06F 19/00* (2006.01)

(52) U.S. Cl. .................. 701/221; 701/220; 701/15

(58) Field of Classification Search .............. 701/15, 701/16, 220–223
See application file for complete search history.

(56) References Cited

U.S. PATENT DOCUMENTS

| | | | |
|---|---|---|---|
| 4,930,085 A | 5/1990 | Kleinschmidt | 364/449 |
| 5,406,489 A | 4/1995 | Timothy et al. | 364/434 |
| 7,587,277 B1* | 9/2009 | Wells | 701/220 |
| 7,606,665 B2* | 10/2009 | Weed et al. | 701/220 |
| 7,920,943 B2* | 4/2011 | Campbell et al. | 701/9 |

OTHER PUBLICATIONS

George Siouris, Aerospace Avionics Systems, A Modern Synthesis, Academic Press, 1993, U.S.A.
Paper: B. M. Scherzinger, Inertial Navigator Error Models for Large Heading Uncertainty, in Proc. Int. Symp. Kinematic Systems in Geodesy, Geomatics and Navigation, Banff, Canada, Aug. 30-Sep. 2, 1994, pp. 121-230.

* cited by examiner

*Primary Examiner* — Richard M. Camby
(74) *Attorney, Agent, or Firm* — James F. Kirk

(57) ABSTRACT

Two methods for determining a best initial heading estimate for use in an AINS system, while recording position data values and in-motion data values, assigning incremental changes to indexed heading $\psi_k$, calculating a set of time indexed present AINS position values and a corresponding set of time indexed absolute horizontal position measurement residual values, recording the absolute maximum time indexed horizontal position measurement residual and the corresponding value of $\psi_k$ returning to the step of assigning an incremental increase to a next value to indexed heading $\psi_k$ up to 360 degrees, identifying the maximum time indexed horizontal position measurement residual and corresponding $\psi_k$, followed by identifying the $\psi_k$ having the smallest absolute maximum horizontal position measurement residual as $A_k$. Second method uses a circular array of AINS ENGINES each with a different $\psi_k$ running in parallel and finding smallest horizontal position measurement residual for $A_k$.

19 Claims, 8 Drawing Sheets

To FIG. 6b
STEP 6.

METHODS FOR DETERMINING AN INITIAL AINS HEADING

FIELD OF THE INVENTION

This invention relates to the field of aided inertial navigation system (AINS) and more particularly to the field of selecting a best estimate of the system wander angle or system heading before the start of fine alignment or gyrocompassing. The present invention provides a best indexed angle $A_k$ (a best initial heading estimate) selected from an indexed array of estimated indexed wander angles $\psi_k$ for use as an initial estimate of a wander angle and for subsequent use during in stationary or in-motion gyro-compassing alignment during which a precise wander angle $\psi$ is calculated. A principal purpose of the invention method is the elimination of the need for a magnetic compass input or other external heading estimate of the wander angle for use as an input at the start of a gyrocompassing routine or process. In addition to use in precision surveying systems such as those that have an AINS that is aided by a GNSS, the present invention can be applied in low dynamics and low cost applications such as MEMS AINS handheld navigation system initialization that cannot be completed by traditional gyro-compassing techniques. The present invention can also be used to accurately correct an AINS heading error after a long dead-reckoning navigation time interval.

BACKGROUND AND RELATED ART

The initial heading of an inertial navigation system (INS) is typically determined with the use of a fine alignment gyrocompassing process or method. An INS alignment is performed either with the IMU at rest on the ground or in motion. A ground or stationary alignment uses gyrocompassing to determine the initial heading or wander angle using the angular rate vector sensed by the IMU from the Earth's rotation rate when the IMU is stationary. The accuracy of a gyrocompassed heading is proportional to the quality of the gyro measurements and the square root of the alignment time.

In general, gyrocompassing requires highly accurate gyroscopes and long alignment times. A ground alignment can also be accomplished with the use of external heading sensors such as magnetic compass or multi-antenna GNSS-based attitude determination system. However, external heading sensors can have disadvantages. A magnetic compass is affected by magnetic disturbance and local magnetic fields and a magnetic compass requires special care in sensor calibration and installation. A multi-antenna GNSS-based attitude determination system is expensive and the GNSS antennas must be separated by as large a distance as possible, which prohibits its use in small vehicle or pedestrian navigation applications.

An in-motion alignment method begins with arbitrarily setting the initial attitude of the IMU to zero degrees roll, pitch and heading, and subsequently uses the AINS Kalman filter to estimate the attitude errors with the aiding from an external velocity and/or position reference source such as a GNSS receiver. The Kalman filter's estimated roll and pitch errors converge quickly regardless of IMU dynamics when position and velocity aiding data are available to the Kalman filter. The Kalman filter's estimated heading error requires a longer time to converge depending on the vehicle dynamics.

For airborne or land vehicle applications, convergence is obtained in about 1 minute if the vehicle executes rapid turns that generate large centripetal accelerations. For man-portable mobile applications, where the dynamics experienced are smaller, in-motion alignment requires a long and possibly unacceptable convergence time.

SUMMARY OF THE INVENTION

The present invention rapidly determines the initial heading of an AINS to an accuracy of 5 degrees or better and thereby significantly simplifies and shortens the initialization and fine alignment time in kinematic applications including airborne, marine, land vehicle, and man-portable inertial navigation systems, by eliminating the need to refer to and read an external heading reference such as a magnetic compass. It is an object of this invention to provide a means for estimating an azimuth heading shortly after power-up without reference to a magnetic or other reference compass and to operate with a system such as a man-portable application in which large centripetal accelerations typically do not occur.

The present invention is used with an AINS with a GPS receiver input and a Kalman filter. The method of this innovation is used after applying power, and before the start of fine alignment or gyrocompassing, After power is applied, The operator moves or walks the system around for a short period of time. During this phase, a GPS receiver continues to provide aiding navigational data that is recorded concurrently with AINS data.

Initially, the system has no idea of which way north is. At power up, the system is initialized using accelerometer outputs to determine what the Euler angles are as to roll and pitch. Subsequent to that, outputs from the accelerometers are integrated to provide Vx, Vy and Vz data that is time indexed and saved as time progresses second by second. The system still has no idea of which way north is. The outputs of the strap down accelerometers are still processed through direction cosine matrices to yield Vx, Vy and Vz values in local level coordinate. As data from the AINS is gathered, absent a heading or wander angle estimate of the angle between the x axis and north, the system has no way initially to use the data for time and distance tracking, so the method just logs the AINS data along with corresponding time indexed GPS receiver position data, both for use at a point in time about eight to ten seconds after power is applied and the operator starts to walk around or move the system with respect to its geographic location.

The inventive step now becomes more apparent. The system performs sets of "what if computations" using a family of indexed wander angles $\psi_k$ for each pair of GPS "Lat-Long" position data recorded and along with the corresponding previously recorded AINS Vx. Vy, Vz and Euler angle data. The two sources are separate. The GPS position data is definite for each GPS epoch. That is about once a second. Absent any external source of heading, the method starts calculating time indexed Kalman Filter position residual errors based on its laddered value or incremented guesses of the indexed wander angle $\psi_k$.

The "what if" computation is completed using indexed wander angles $\psi_k$ selected from a predetermined or incremented set of wander angles that extend from 0-359 degrees, or for a more sparse sub-set of angles selected there from, for each set of Vx, Vy and each GPS Lat and Long position data. Each computation results north and an east residuals from the Kalman Filter. By way of example, if the system used a sparce sub set of 5 degree increments, the method computes 72 pairs of residuals for each of 10 GPS present positions (one per second) logged over a ten second period of movement. That would yield about 720 pairs of residuals.

If an assumed indexed wander angle $\psi_k$ is not close, then the residuals that result are large. When the assumed indexed wander angle $\psi_k$ is closer to the actual wander angle, the residuals get smaller. It should be appreciated that the wander angle is probably changing as the operator continues to move the system during the 10 seconds of movement. The system does the computation for each assumed indexed wander angle $\psi_k$ at high speed. The assumed indexed wander angle increments may be in 5 or other degree steps and that will be a design choice.

FIGS. 1 and 3 and in the flow charts of FIGS. 5a and 5b, the inventor provides a method of managing the results of the calculations using a serial computing technique so that the method leads to a selection of the best guess of what the initial wander angle should have been that corresponded to the smallest corresponding residuals that resulted. In the FIGS. 2 and 4 and the flow charts of 6a and 6b, the inventor provides a method of managing the results of the calculations using a parallel computing technique with an array of AINS engines.

The real invention here is the inventor's willingness to get out of the perfect solution box that most analytic types are in, and to guess at what the wander angle might be instead of knowing what it is, and then being willing to do an enormous amount of computation to produce a large field of incorrect values from which the correct value of wander angle is selected based on diminishing residuals from the Kalman filter.

The invention method begins after power-up and the initialization of the present position latitude, longitude and altitude, incremental initial velocity and Euler angle registers with a sequence of steps such as the following:
1. The method records in-motion inertial data as records within a set of records, each record including incremental velocities and incremental angles for a predetermined number of IMU sampling times and records aiding position data such as latitude, longitude and altitude at each aiding sensor epoch referred to as a filter interval.
2. The method detects if the AINS has moved with position aiding for N seconds. If YES, go to next step. If NO, go back to step 1.
3. The method then assigns an initial indexed heading of $\psi_k = \Delta\psi_k \times k$ degrees to the AINS where $k \in [1, K]$. and $\Delta\psi_k = 360/k$
4. The method then processes recorded in-motion data with assigned initial heading using the AINS algorithm.
5. The method computes and records the corresponding horizontal position measurement residual norm of the AINS Kalman filter at the current Kalman filter time.
6. The method then tests to determine if the AINS has processed all of the records of in-motion data. If the decision is YES, the method goes to the next step. If the decision is NO, the method returns to step 4.
7. The method then identifies the maximum horizontal position measurement residual norm over the N seconds of recorded horizontal position measurement residuals.
8. The method then records the maximum horizontal position measurement residual norm and the corresponding initial heading sample in a separate array.
9. The method then detects to see if k=K, and if the result is YES, the method jumps to step 11, and if the test result is NO, the method jumps to step 10.
10. The method increments the value of k=k+1 and then returns to step 3 to select the next incremented wander angle.
11. The method then identifies the smallest maximum horizontal position measurement residual norm over the K recorded maximum horizontal position measurement residual norms in the separate array of step 8. and assign its corresponding initial heading as the best initial heading solution.

DETAILED DESCRIPTION

Figure 1:
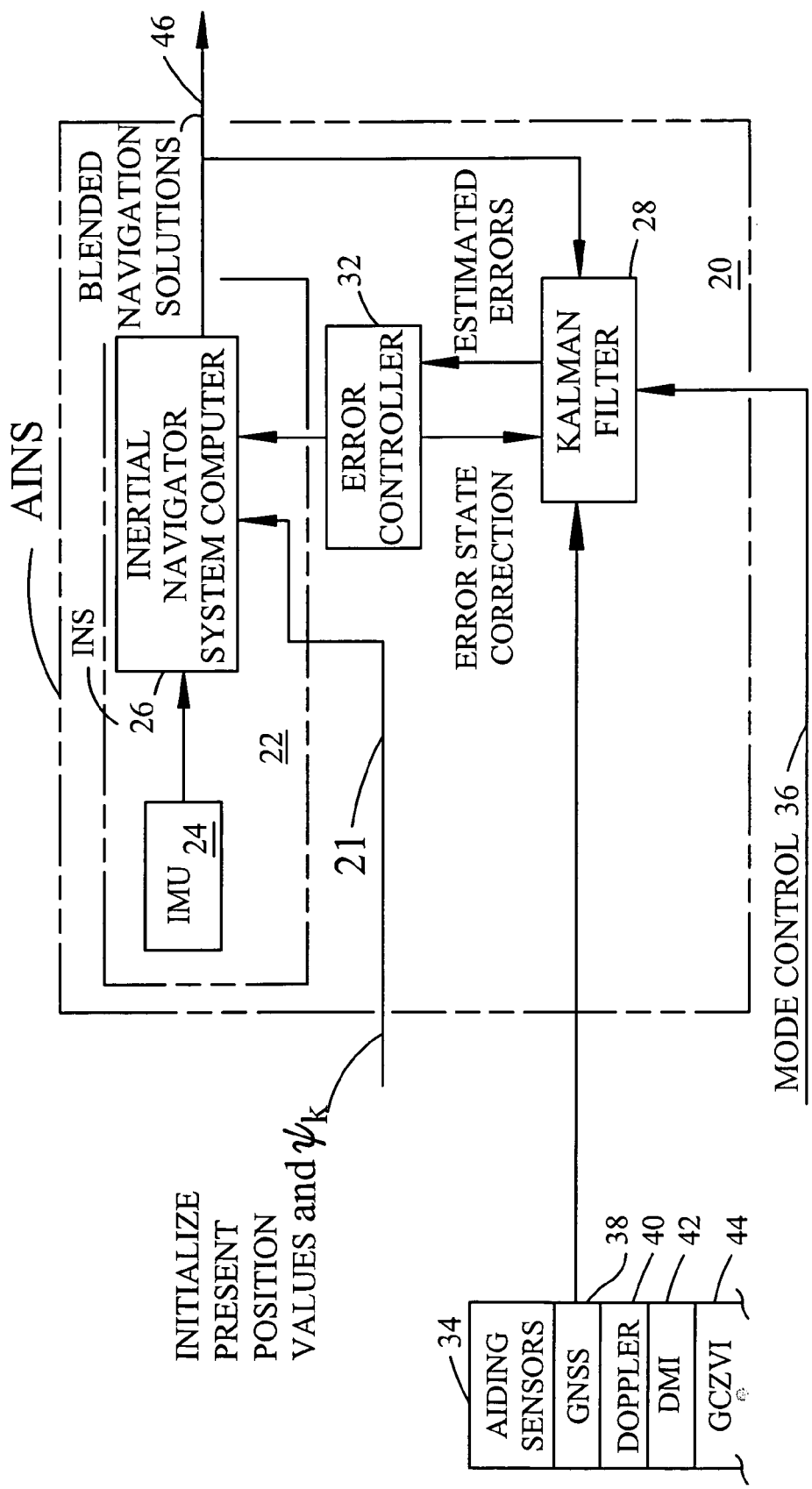
FIG. 1. is a block diagram of a Generic aided-INS architecture used in a system for rapidly determining $A_k$ (a best initial heading estimate angle) by using serial computing, for use by an AINS after data is gathered during a first filter interval, FIG. 2. is a block diagram of a modified Generic aided-INS architecture; using an array of AINS ENGINES and an Initial Heading Program to calculate $A_k$ by parallel computing for use by an AINS as data is gathered during a first filter interval, FIG. 3. is a block diagram for a system or method for rapidly determining $A_k$ for use by an AINS after data is gathered during a first filter interval and before fine alignment and gyro-compassing.

Reference will now be made in detail to various embodiments, and examples of which are illustrated in the accompanying drawings. While the subject matter will be described in conjunction with these embodiments, it will be understood that they are not intended to limit the subject matter to these embodiments. On the contrary, the subject matter described herein is intended to cover alternatives, modifications and equivalents, which may be included within the spirit and scope as defined by the appended claims. Furthermore, in the following description, numerous specific details are set forth in order to provide a thorough understanding of the subject matter. In other instances, well-known methods, procedures, objects, and circuits have not been described in detail as not to unnecessarily obscure aspects of the subject matter.
Notation and Nomenclature Unless specifically stated otherwise as apparent from the following discussions, it is appreciated that throughout the present detailed description, discussions utilizing terms such as "obtaining," "providing," "receiving," "processing," "generating," "transmitting,", "coupling," "utilizing," "conveying," "using," "measuring," "controlling," "communicating," or the like, refer to the actions and processes of a computer system or similar electronic computing device. A computer system of the present invention or similar electronic computing device manipulates and transforms data represented as physical (electronic) quantities within the computer system's registers and memories into other data similarly represented as physical quantities within the computer system memories or registers or other such information storage, transmission, or display devices.

The subject matter discussed herein may be described in the general context of computer-executable instructions, such as modules, which are executed or executable by a computer. Generally, these modules include routines, programs, objects, components, data structures, etc., that perform or implement particular tasks or abstract data types.

An embodiment of the invention can be explained as a method for determining $A_k$ (a best initial heading estimate) with specific references to a first embodiment shown in FIGS. 1, 3, 5a and 5b and a second embodiment shown in FIGS. 2, 4, 6a and 6b. The invention method is used in the initialization of an aided inertial navigation system (AINS) 20, and more particularly to the initialization of a GNSS AINS system. The purpose of the invention is to rapidly compute an INS heading $A_k$ that can be used to initialize an AINS to a state of fine alignment in which the AINS can use the Kalman filter running a small INS error model such as the KF-B filter to be described below.

A state of fine alignment requires the initial INS heading $A_k$ be provided with accuracy of 10 degrees or better. The present invention method provides steps in a process or a method called "A Rapid Aided INS Alignment Method" for determining the initial heading $A_k$ of an AINS to an accuracy of 5 degrees or better in a few seconds after the method is launched with the AINS moving. The AINS must also be receiving accurate position updates from aiding sensors such as a GNSS receiver while moving.

The method for obtaining the best initial heading estimate $A_k$ eliminates the necessity of obtaining a comparable measurement using a magnetic compass corrected for magnetic variation to obtain a platform heading angle with respect to true north or by other reference measurement means that would typically include the step of having an operator enter an equivalent data value into the AINS computer before the start of gyro-compassing and fine alignment begins. The method eliminates the need for a compass or other external heading measurement instrument. The method for determining the initial $A_k$, for use in gyro-compassing as described herein, is used immediately prior to the start of a fine alignment and gyro-compassing program (not shown) running in an AINS (an aided INS) computer (not shown) in an AINS system being represented by phantom block 20.

Aided Inertial Navigation System (AINS)

An aided inertial navigation system (AINS) comprises an INS, one or more aiding sensors, a Kalman filter and a mechanism for correcting the INS. FIG. 1 shows a generic aided INS architecture.

Figure 2:
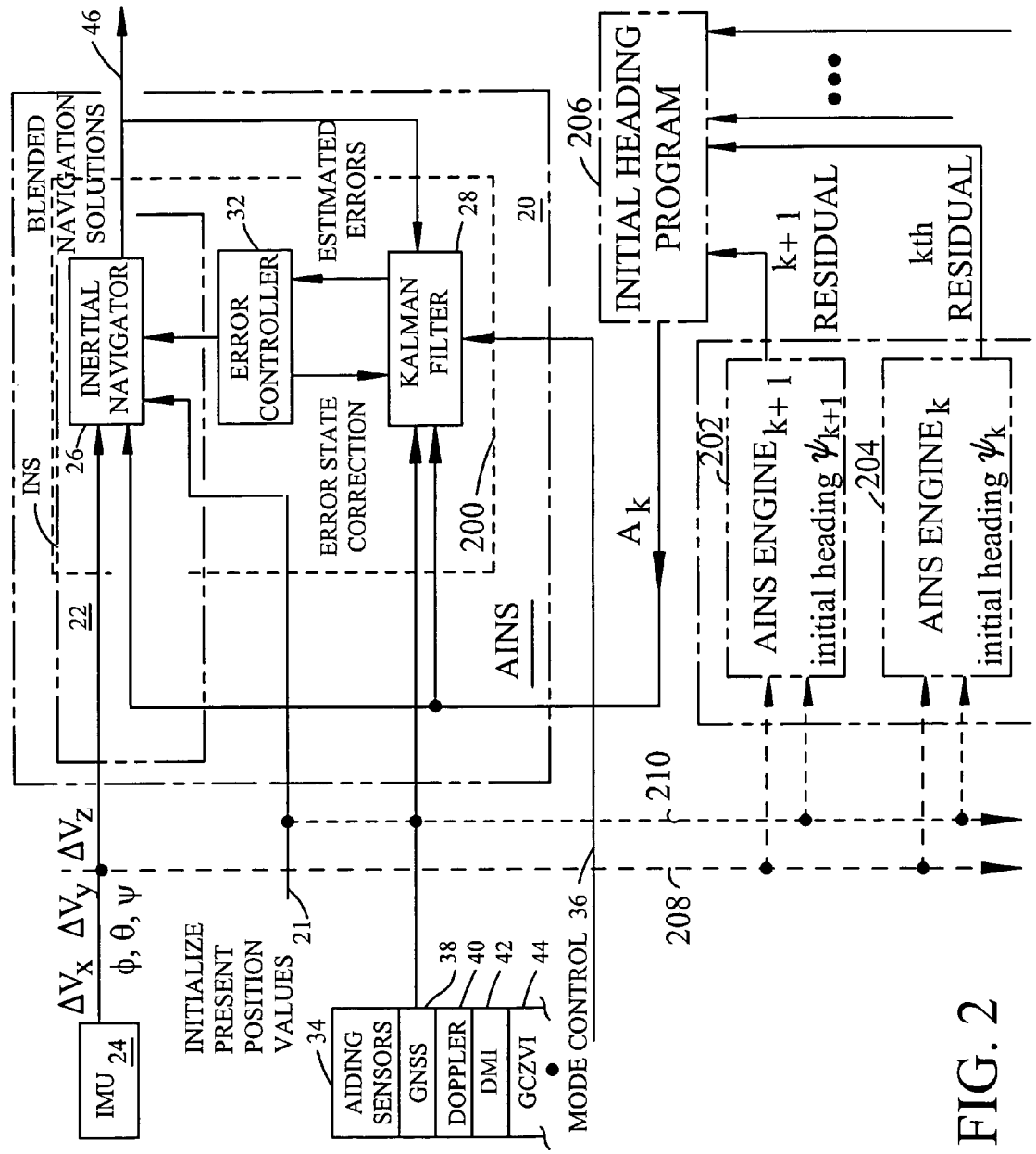

The state-of-the-art in aided inertial navigation is mature. The technology originated in the late 1960's, and found application on several military navigation systems, notably the F-111 navigation system. Since then, much research has been conducted and much literature has been generated on the subject. An example of a text book on the subject is: George Siouris, Aerospace Avionics Systems, A Modern. Synthesis, Academic Press 1993. An equivalent of FIG. 1 is shown in FIG. 6-2 on page 273 of the text Aerospace Avionics Systems.

FIG. 1 is a block diagram of the architecture of a generic AINS within phantom block 20. The AINS is provided with an initial present position input from a keyboard or other input device (not shown) on a signal path such as signal path 21. An INS within phantom block 22 has an Inertial Measuring Unit (MU) 24 and an inertial navigator computer 26. The IMU 24 typically has a triax of accelerometers and a triax of gyros that (not shown) are mechanically fixed to the frame of the navigator package mounted to an airframe, vehicle or surveyor's staff that generate incremental velocities and incremental angles at the IMU sampling rate, typically 50 to 500 samples per second. The corresponding IMU sampling time interval is the inverse of the IMU sampling rate, typically 1/50 to 1/500 seconds. The incremental velocities are the specific forces from the IMU accelerometers integrated over the IMU sampling time interval. The incremental angles are the angular rates from the IMU gyros integrated over the IMU sampling time interval. The inertial navigator system computer 26 receives the inertial data from the IMU 24 and computes the current IMU position (typically latitude, longitude, altitude), velocity (typically North, East and Down components) and orientation (roll, pitch and heading) at the IMU 24 sampling rate.

The inertial navigator system computer 26 performs alignment and inertial navigation computational functions using data from the IMU 24. A Kalman filter 28 and an error controller 32 estimate INS 22 errors and correct the INS 22 by using inputs to the Kalman filter 28 from one or more aiding sensors within phantom block 34. A mode control signal path 36 provides control information on the state of the navigator is in. The Mode selected can be the ALIGNMENT MODE or the operator may have moved from alignment into the free inertial or NAVIGATE MODE.

The aiding sensors 34 are any sensors that provide navigation information that is statistically independent of the inertial navigation solution that the INS generates. Examples of aiding sensors are one or more GNSS receivers, an odometer or distance measuring indicator (DMI), and a Doppler radar velocity detector.

Aiding sensor errors can include the following:
GNSS North, East and Down position errors
GNSS carrier phase ambiguities
DMI scale factor error Examples of aiding sensors referenced on FIG. 1, and present within block 34 include one or more global navigation satellite system (GNSS) receivers 38, a Doppler radar providing velocity data 40, an odometer or distance measuring indicator or instrument (DMI) 42, or a ground contact zero velocity input (GCZVI) switch 44.

The aiding sensors in block 34 therefore represents any sensor(s) that provide navigation information that is statistically independent of the inertial navigation solution that the INS 22 generates.

The Kalman filter 28 and the error controller 32 process and provide corrections for the solutions of the program running in the inertial navigator system computer 26 which periodically outputs a sequence of corrected or blended present position solutions in real time on output bus 46. The Kalman filter 28 is a recursive minimum-variance estimation algorithm that computes an estimate of a state vector based on constructed measurements. The measurements typically comprise computed differences between the inertial navigation solution elements and corresponding data elements from the aiding sensors. For example, an inertial-GPS position measurement comprises the differences in the latitudes, longitudes and altitudes respectively computed by the inertial navigator and a GPS receiver. The true positions cancel in the differences, so that the differences in the position errors remain. A Kalman filter designed for integration of an INS and aiding sensors will typically estimate the errors in the INS blended solutions based on information from the aiding sensors. The INS errors typically comprise the following:
inertial North, East and Down position errors
inertial North, East and Down velocity errors
inertial platform misalignment errors
accelerometer biases
gyro biases The error controller 32 computes a vector of resets from the INS error estimates generated by the Kalman filter 28 and applies these to the inertial navigator integration processes, thereby regulating the inertial navigator errors in a closed-loop error control loop. The closed-loop error control causes the inertial navigator 26 errors to be continuously regulated and hence maintained at significantly smaller magnitudes that an uncontrolled or free-inertial navigator would be capable of.

Technical Description

When running in or with an alignment and gyro-compassing program in an AINS computer (not shown) in an AINS system 20 represented by phantom block 20 the method receives and stores a continuous series of time indexed aiding position data values, i.e. latitude, longitude and altitude values, from a position transducer, such as the GNSS receiver 38 during a filter interval that follows an initial power-up and leveling interval. The filter interval referred to here takes a few seconds and precedes system entry into a gyro-compassing phase of alignment.

During the same filter interval, the method also receives and stores a sequence of time indexed incremental Euler angles (pitch, roll and azimuth) and platform velocities in-motion data values from the IMU 24 between each timed indexed aiding position data value as well as an initializing value for the indexed heading increment, $\Delta\psi$ and for an index constant K that provides a 360 degree boundary to each set of test calculations using a new indexed heading $\psi_k$.

Determining an Initial AINS Heading Using Serial Computing

As will be explained below, in connection with the detail steps of FIG. 5a and 5b, the invention process or method is based on the fact that the horizontal position measurement residual computed by the AINS Kalman filter that runs a small INS error model such as the KF-B filter in the first few seconds (the filter interval) after power-up, and after initial leveling during which the AINS is physically moving, is mainly contributed to by error from the initial heading $A_k$.

The present invention method obtains the best value for initial heading $A_k$ after power-up and after initial leveling process and at the end of the filter interval by testing samples or iterations of a series of sets of initial headings taken at increments of $\Delta\psi$ with each set having increments or iterations that extend from 0 to 360 degrees. Each set is processed using processed and recorded inertial and aiding sensor data collected from the AINS over the first few seconds, i.e. during the filter interval, while the AINS is kept in motion and as each initial heading sample is used. The method then determines the best initial heading $A_k$ as the initial heading that results in the smallest maximum horizontal position measurement residual magnitude that was obtained over the few seconds of motion (the filter interval).

The alignment method does not require high cost gyros, external heading sensors and high acceleration dynamics, and is applicable to any kinematics application including airborne, marine, land vehicle, and man-portable navigation.

Figure 3:
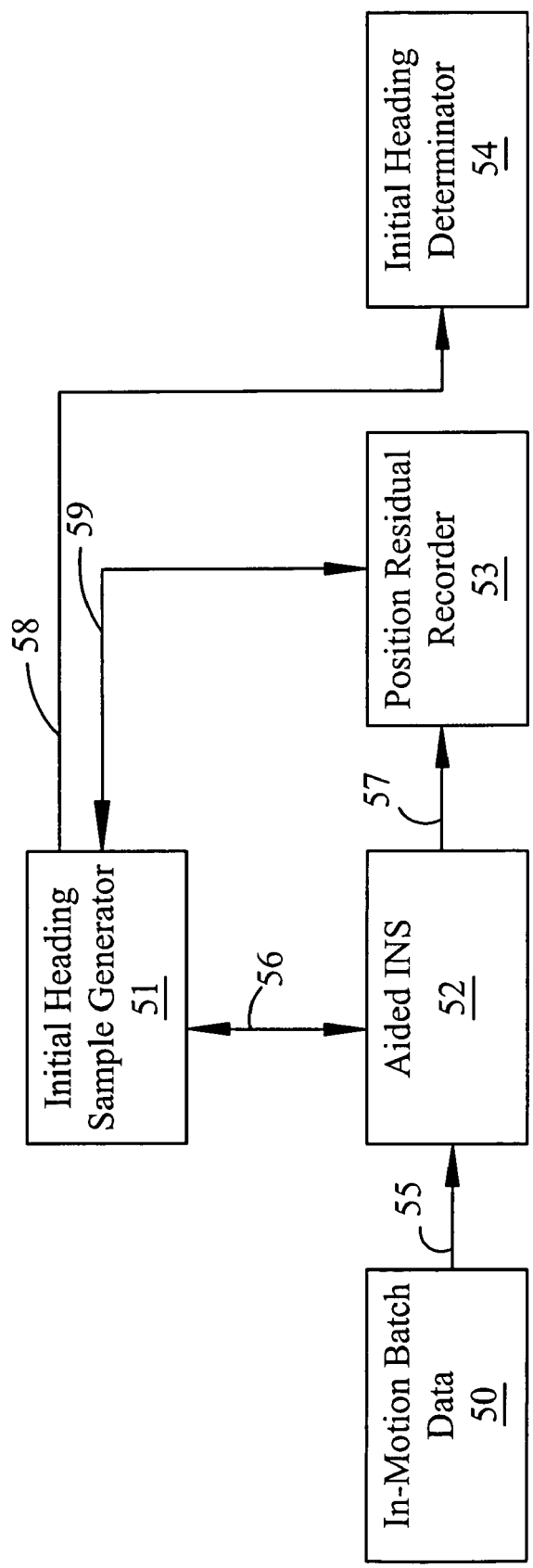

FIG. 3. is a block diagram for a system or method for rapidly determining $A_k$ (a best initial heading estimate angle) for later use by an AINS in aligning and gyro-compassing. FIG. 3. shows the architecture of the rapid aided INS alignment system having five components: the In-Motion Batch Data 50 is a block that represents the step of obtaining in-motion data and aiding position data from the IMU and the GNSS and passing the data to the AINS computer 52 via path 55 during the in-motion filter interval. No computation is performed during the in-motion filter interval. The Initial Heading Sample Generator 51 is shown coupled to the AINS 52 via path 56. After the in-motion filter interval, the Position Residual Recorder 53 receives sets of horizontal residuals for each indexed heading and passes the data via path 59 to the Initial Heading Sample Generator 51 for examination. The Initial Heading Sample Generator 51 saves the maximum horizontal residual from each set of N residuals and saves the maximum residual along with the corresponding indexed heading in a storage array. The AINS computer 52 controls the process via paths 56 and 57. When the sets of data have been processed to obtain an array of maximum residuals and corresponding indexed headings, the Initial Heading Determinator 54 searches the array for the minimum horizontal residual via path 59 and when it is found, the corresponding indexed heading is identified as the best initial heading estimate.

The recorded inertial data comprise incremental velocities and incremental angles from the IMU 24 at each IMU sampling time, typically every 5-20 milliseconds. The aiding sensor data comprises position information (typically latitude, longitude and altitude) generated by the aiding sensor, typically every second. The Initial Heading Sample Generator 51 generates K initial heading samples in the range of 0 to 360 degrees, each sample in a set having a step size $\Delta\psi=360/K$. The AINS 52 implements a Kalman filter described below as a KF-B filter, that uses a small INS error model, such as in Equation 8 below, and processes the In-Motion Batch Data in block 50 recursively using each initial heading sample assigned by the Initial Heading Sample Generator 51 via path 56 and outputs the corresponding position residual vector at each Kalman filter time to the Position Residual Recorder 53 via path 57, typically every second.

Figure 5A:
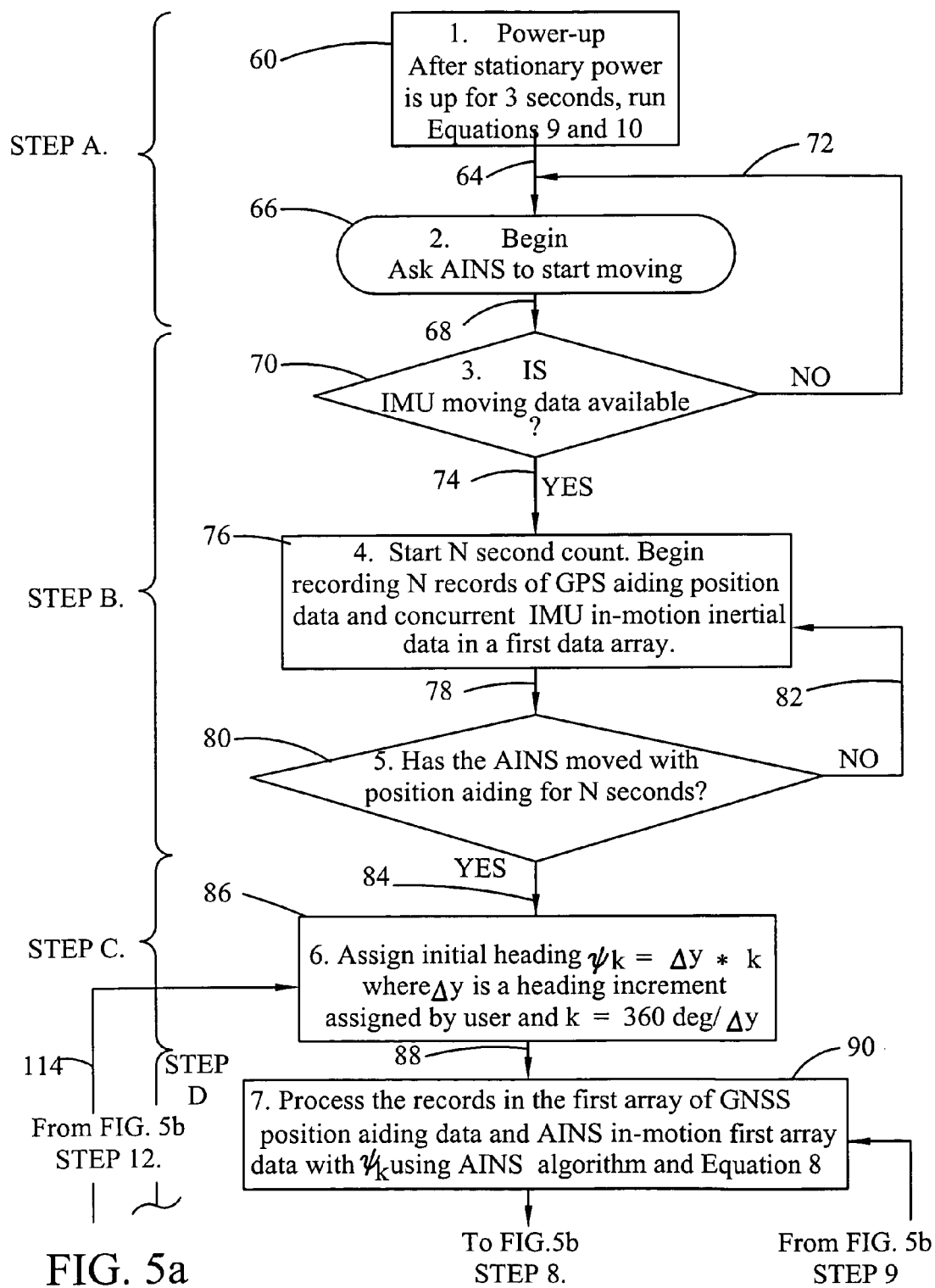
FIG. 5a and FIG. 5b form a flowchart characterizing the method or process for serially calculating $A_k$ for subsequent use in the alignment of an AINS using a single AINS computer, after a data gathering interval.
Figure 5B:
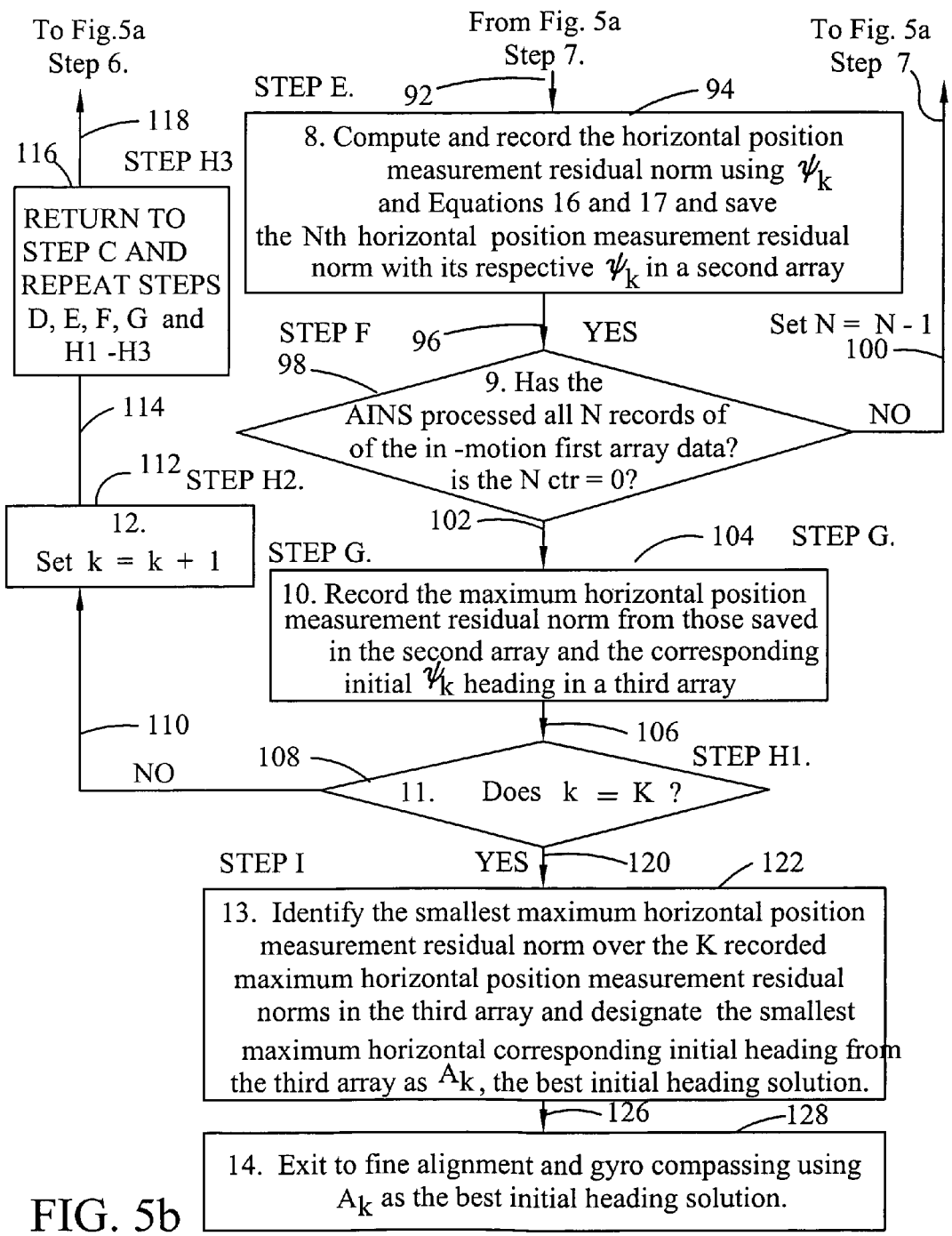

In operation, the embodiment of FIGS. 1, 3 and the flow charts FIGS. 5a and 5b use the Position Residual Recorder 53 of FIG. 3 to compute the horizontal position measurement residual norm at each Kalman filter epoch. The method FIGS. 1, 3 and the flow charts FIGS. 5a and 5b teach serial processing of the N samples of data with a single computer. Each of the N sample sets are each processed with an indexed heading $\psi_k$ selected from a set of K heading samples. The Initial Heading Sample Generator 51 identifies and saves the value of the maximum horizontal residual for each of the N sample sets and its corresponding indexed heading $\psi_k$ in a separate array of K pairs.

After all K initial heading samples have been processed, each with the N sample set, the Initial Heading Determinator 54 scans the recorded maximum horizontal residuals in the separate array and identifies the indexed heading $\psi_k$ with the smallest maximum horizontal residual as $A_k$ (the best initial heading estimate). It should be clear to one skilled in the art, that the functions described for blocks 53 and 54 can be performed by software subroutines in the AINS computer or by special purpose digital and digital comparator circuitry.

FIGS. 5a and 5b show the steps in a serial computing process for the computation of Ak (a best initial heading estimate) of the wander angle between the platform's x axis and true north. The method steps will now be described in detail with reference to the flow chart. Block 60 at the top of FIG. 5a represents a start or entry step in the overall method. The power-up sequence initiates activation and boot-up of the on-board computer and all support analog circuits including those that activate a typical tri-ax of gyros and a tri-ax of accelerometers (not shown) on the sensitive axes of the INS within the AINS (not shown). As power-up commences, and stationary power is up for a few (typically 3) seconds, the AINS computer records initial velocities as zeros and calculates and records an initial pitch angle $\theta$, and an initial roll angle $\phi$ using an accelerometer leveling pitch angle alignment process and an accelerometer leveling roll angle alignment process. The system uses the results of Equations 9 and 10 to establish the Euler angles between the reference plane formed by the pitch and roll axes and the gravity vector. After the initial power-up, incremental outputs from the rate gyros are integrated to track the Euler angles of pitch and roll.

The method then advances via path 64 to block 66 for step A. in which the system directs the operator to start physically moving the AINS system 20 of FIG. 1 for a predetermined number of N seconds during the filter interval. The method then advances via path 68 to decision block 70 where the method or program begins testing to determine if IMU moving data is available. In the absence of moving data, a NO response results in the program looping back via path 72 to path 64, and re-entering block 66 and decision block 70 to again test to see if moving data is available which might be signaled by the arrival of a latitude and longitude position string or record of data from a source such as a GNSS along with pitch and roll Euler angle information for the pitch and roll axes. In addition to obtaining present position aiding GNSS data, and IMU related in-motion data, the method can also use a barometric altimeter, or manual data input for altitude data information.

As the system obtains a positive or YES response at decision block 70, the system advances via path 74 to block 76 where an N second timing counter is initialized at the start of the filter interval and during which a predetermined number (N) of time indexed aiding position data values (present position latitude, longitude and altitude values) are stored or recorded in a first array. During the same filter interval, the system receives and stores a corresponding sequence of time indexed incremental Euler angles and platform velocity in-motion data values between and concurrent with each GNSS time indexed aiding position data value in a second array.

The method then advances via path 78 to decision block 80 to test and determine if the AINS has been moving for N seconds which marks the end of the filter interval. If the decision block 80 determines that the N second timer has not timed out, the method returns via path 82 to block 76 and continues to record data and then return to decision block 80 over and over again until the N counter runs to zero.

When decision block 80 determines that the N timer has timed out and that the AINS has been moving for N seconds during which position aiding data (latitude and longitude) was being stored, the method of FIG. 5a advances via path 84 to block 86, Step B, to start the step of assigning a first initial heading of $\Delta\psi \times k$. The symbol "x" is to be interpreted as an ordinary numerical multiply. On the first pass, k could be zero, so the initial or first time value of the initial indexed heading $\psi_k = \Delta\psi \times k$ is zero or near zero degrees. On subsequent passes through block 86, it will be shown that the value of k increases monotonically resulting in a stepped linear increase in the value of $\psi_k$, the values of which are used during step C in each subsequent evaluation of the records of data collected during the filter interval. It should be understood that the indexed heading $\psi_k$ characterizes a predetermined indexed heading selected from a circular set of K indexed headings extending in uniform spaced relation sequence from a first indexed heading at say zero degrees to the last indexed heading, at say 359 degrees. The circular set selected may be sparse. A typical set might use indexed heading values separated by five degree increments.

Once the first or next value is selected for initial indexed heading $\psi_k$, the method advances via path 88 to Step D, block 90. The claimed method reads the recorded in-motion data stored in the first array and associates the in-motion data with the $\psi_k$ selected in block 86. Using the AINS algorithm and Equation 8 shown below. The method then leaves Step D, block 90, and progresses via path 92 to FIG. 5b, to Step E, represented by block 94.

In addition to the time indexed aiding position data values in the first array, the method uses the time indexed incremental Euler angles and platform velocity in-motion data values also in the first array, the initial indexed heading $\psi_k$, initial pitch and roll angles, and initial velocities also in the first array as inputs to the AINS system shown as block 52 of FIG. 3 and represented by block 20 in FIG. 1 having a Kalman filter 28, an error controller 32 and an inertial navigator 26.

As the method advances via path 92 to block 94, to start step E at the top of FIG. 5b in a process in which it calculates a second array of time indexed absolute horizontal position measurement residual values for each corresponding time indexed present position value in the first array using an AINS Kalman filter position measurement residual computation process and a horizontal position measurement residual computation process using Equations 16 and 17.

At the conclusion of step E. the method advances via path 96 to Step F, the decision block 98, to test and determine if the AINS has processed all of the time indexed in-motion data in the set acquired during the filter interval. If the test shows that the all of the time indexed in-motion data has not been processed, the method returns to block 90 via path 100 and processes the next unprocessed set of time indexed in-motion data. If the result of the test of block 98 is positive, the method advances via path 102 to block 104 in which it begins Step G. in the method.

Step G. in block 104 provides for a method for identifying the absolute maximum time indexed horizontal position measurement residual within the second array of time indexed absolute horizontal position measurement residual values. Once the maximum value is identified, it is recorded along with the corresponding value of initial indexed heading $\psi_k$ used in step B in a third array.

After step G. is completed, the method advances via path 106 to decision block 108 to perform step H1. in which it determines if index k=K where K is a predetermined constant characterized to prevent initial indexed heading $\psi_k$ from exceeding 360 degrees.

If the decision block determines that k is not equal to K, the method advances via path 110 to block 112, Step H2, and adds 1 to k to obtain the next value of k. The method then advances via path 114 to block 116, Step H3. Step H3 Block 116 directs the method to return to step B. via path 118 to FIG. 5a to re-enter block 86 in which it again calculates the next value of initial indexed heading $\psi_k = \Delta\psi \times k$ as a process for selecting a predetermined indexed heading from a circular set of K indexed headings extending in uniform spaced relation sequence from a first indexed heading at say zero degrees to the last indexed heading, at say 359 degrees. The method then again repeats steps C, D, E F, G and H1-H3.

If the decision block 108 for step H1. determines that k=K, the method advances via path 120 to block 122 and performs step H1 in which the method identifies the smallest absolute maximum horizontal position measurement residual over the K recorded maximum horizontal position measurement residuals in the third array and selects the corresponding values of initial indexed heading $\psi^k$ as $A_k$ (a best initial heading estimate). The method then uses path 126 to advance to block 128 to exit to the fine alignment and gyro-compassing program in which it uses the selected $A_k$.

In this first embodiment, as the measurement period ends, there appears to be a period of time from when the start of the residual computations until the $A_k$ value is determined. With five degree space increments, 72 residuals are computed suggesting that during that computation interval, errors would accumulate. However, at the end of the interval, the value of $A_k$ is used along with all of the previously recorded time indexed records, each record having a corresponding sub-set of time indexed aiding position data values and a corresponding sub-sets of time indexed in-motion data values in the first array to reprocess the data and update the position and platform state. Thus, the angle $A_k$ is a constant to be established at time equal zero for the purpose of alignment. Once the value of $A_k$ is determined, its value is fed back via the AINS for use in re-computing the systems state values and positions. The AINS re-processes all the data from the beginning and outputs the navigation solutions from the 1st second to the Nth second in the serial processing process of the first embodiment.

Determining an Initial AINS Heading Using Parallel Computing

A second alternative embodiment is explained below, in connection with the parallel processing system of FIGS. 2 and 4 and the detail steps of FIGS. 6a and 6b. The second embodiment of the invention is shown in the drawings as a system or method. The added topology or functional blocks which may be implemented as hardware or software and the AINS ENGINES shown may be operating with a common clock.

In the parallel processing system for determining $A_k$, an array of AINS ENGINES are initialized with a sequence of predetermined and uniformly separated initial heading angles $\psi_k$, and from a data buss they also receive time indexed aiding position data values and a corresponding sub-sets of time indexed in-motion data values that make it possible for each AINS engine to begin to calculate horizontal position measurement residuals and present position values based on the initialization at the start of motion and to continue to do so for the next (N) seconds. The AINS engine that is initialized with a $\psi_k$ value closest to the actual $A_k$ will produce the smallest sum of horizontal residuals over the moving period of (N) seconds. The smallest sum of horizontal residuals therefore points to the AINS engine that had been initialized with a value of $\psi_k$ closest to the angle $A_k$. With the angle $A_k$, the initial heading (AINS sub kth engine) identified, the navigation solution from the 1st second to the Nth second is obtained by simply using the pre-stored navigation solutions from the identified AINS sub kth. engine FIG. 2. shows the block diagram for a parallel computational system that uses an AINS ENGINE 200 that is one of an array of AINS ENGINES 202, 204. The IMU 24 is unchanged from that shown in FIG. 1, AINS ENGINES 202 and 204 represent a set of K AINS computers or functional elements where K represents the number of segments of a circle for which there are indexed headings. The invention contemplates that the AINS ENGINES may be mechanized as separate digital machines or separate computers or may reside as separate program blocks running concurrently and independently in a special purpose host computer.

The number of AINS ENGINES may be high. A system mechanized with five degree separation between initial indexed headings would require 72 AINS ENGINES or computers running independently while the system is initially moving for N seconds as GNSS position aiding samples and in-motion samples are measured and recorded.

Each AINS ENGINE as shown, is a computer running an initial heading program in addition to the navigational program. The initial heading program is coupled to receive and record each time indexed horizontal position residue with a corresponding indexed heading from each respective AINS engine, and to select the indexed heading corresponding to the smallest sum of time indexed horizontal position residue received from the array of AINS ENGINES after a predefined N seconds movement of the AINS after power up. The indexed heading corresponding to the smallest sum of time indexed horizontal position measurement residual is identified as $A_k$ (a best initial heading estimate) and is a second embodiment that uses a AINS ENGINE to calculate a final blended navigational solution, the initial heading program couples the value of $A_k$ to the AINS for immediate use in alignment.

Figure 4:
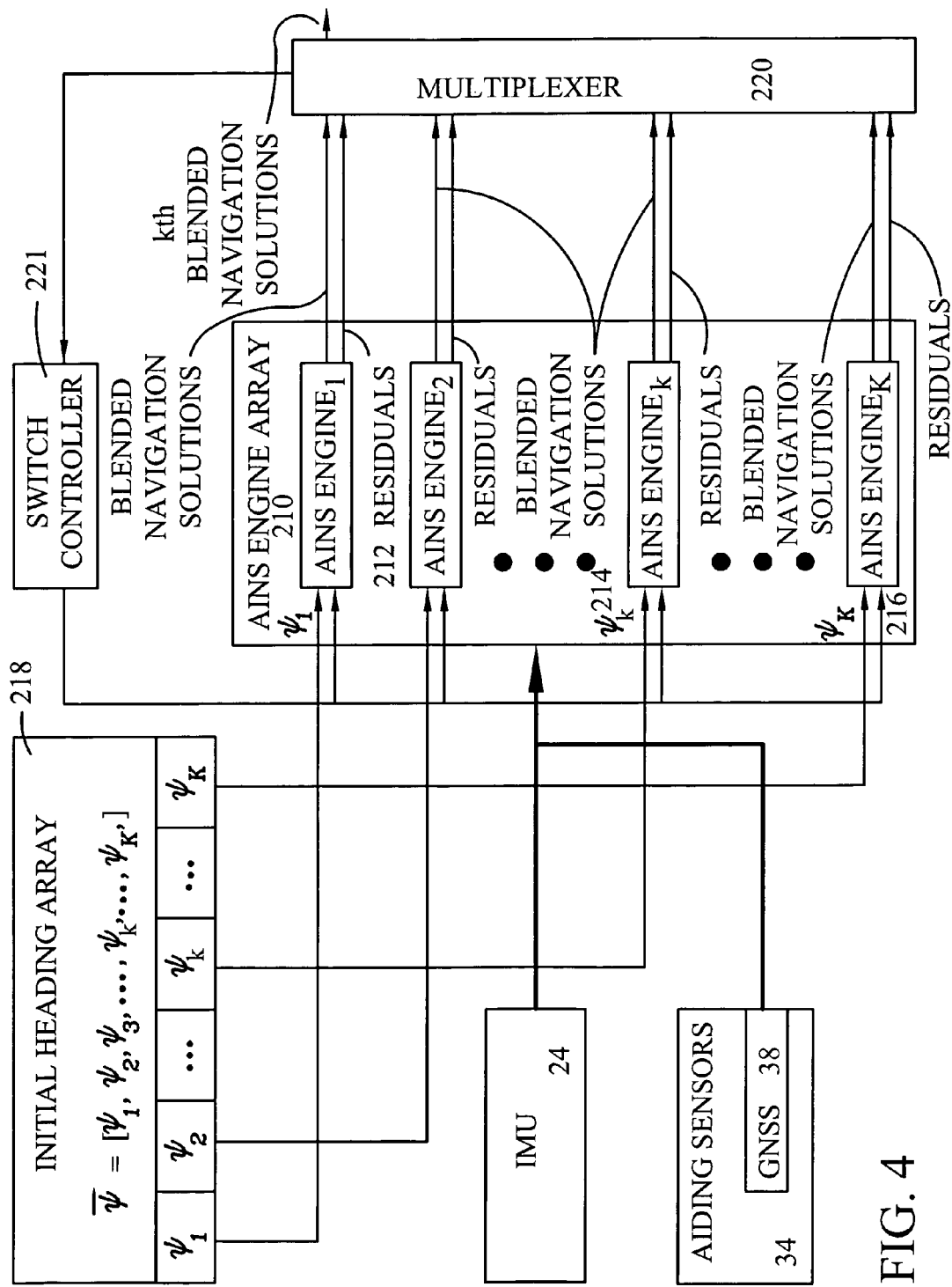
FIG. 4. is a block diagram that shows an array of AINS ENGINES receiving a predetermined indexed array of estimated indexed wander angles $\psi_k$, each for use as an initial estimate of a wander angle in the computation of respective navigational solutions including respective horizontal residuals.

Each AINS engine shown in FIGS. 2 and 4 has a dedicated inertial navigator computer that is running independently of all other navigational computers. Each navigator computer is coupled to the data bus and is responsive to data from the IMU 24. A dedicated error controller 32 is coupled via hardware or software to exchange data with a Kalman filter 28 and it provides correction data to the inertial navigator computer 26. The Kalman filter is coupled to receive GNSS position data from the GNSS 38 and it is initialized with $A_k$ from the initial heading program or from the INITIAL HEADING ARRAY 218 shown on FIG. 4.

The function of the aiding sensors 34 is unchanged from that in FIG. 1. An INITIAL HEADING PROGRAM 206 receives residual data from the AINS ENGINES 202, 204 during the in-motion interval. The AINS ENGINES refer to the data available to them including the heading estimate that is provided to each engine. Each Engine computes a respective horizontal residual with the arrival of each new frame of data and passes the resulting horizontal residual on to the INITIAL HEADING PROGRAM 206 with its identifying sequence or AINS ENGINE number and corresponding heading estimate.

As shown in FIG. 2, the INITIAL HEADING PROGRAM 206 sums the horizontal residuals epoch by epoch for each AINS ENGINE number until a predefined N seconds interval times out. At the Nth second, the INITIAL HEADING PROGRAM selects the heading estimate with the minimum corresponding sum of horizontal residuals as the best initial heading estimate and reports that value to AINS ENGINE 200 for use in the instant computation of blended navigational solutions after the Nth second. The blended navigational solutions before the Nth second and after power up are post calculated using the identified best initial heading and pre-stored INS and GNSS data from the $1^{st}$ to Nth second.

A first common bus 208 and a second common buss 210 are shown in FIG. 2 moving data from the IMU 24 and from the GNSS 38 to the AINS ENGINES 200, 202 and 204. Each of the K AINS ENGINES have a computer that is coupled to the data buss 210. The alignment program running in each respective AINS ENGINE responds to the INS data from the IMU, the position data from the GNSS, the alignment program being further characterized to provide a series of time indexed horizontal position residues in response to movement of the AINS.

FIG. 4 is an alternative embodiment of the system of FIG. 2 for using a parallel computational approach to selecting a best initial heading estimate.

FIG. 2 shows IMU 24 outside of the phantom block containing the AINS ENGINE 200. However, an AINS would typically contain IMU 24 within the phantom lines defining the perimeter of the AINS. The second or parallel computer embodiments of FIGS. 2, 4, 6a and 6b contemplate the use of an INS computer 26 that is a plurality of INS computers each having its own error controller 32 and Kalman filter 28 shown within phantom block 200 of FIG. 2.

FIG. 4 shows the AINS computers distributed and relabeled as AINS ENGINES, the first being block 210 with AINS ENGINES 212, 214 216 forming an array of AINS ENGINES. Each AINS engine is coupled to the first data buss and a second data buss 210. An INS computer 26, error controller 32 and Kalman filter 28 resides in each AINS ENGINE 200, 202 and 204. IMU 24 is typically an electromechanical or optical assembly coupled to the AINS computer represented by block 26. IMU 24 provides INS data to a first data bus 208 from a triax of accelerometers (not shown) and data from a triax of rate gyros (not shown). An array of AINS engine computers 200, 202, 204 are shown coupled to the first data bus 208 to be receive INS data. Each AINS ENGINE is an INS computer with an alignment program initialized with an indexed heading $\psi_k$. FIG. 4 shows a predetermined heading array of $\psi_k$ values being distributed from a source such as a ROM or PROM. The values of $\psi_k$ are selected from a circular set of K indexed headings extending in a uniform spaced relation sequence from a first to a Kth or last indexed heading.

FIG. 4 is an information flow diagram that shows the use of a MULTIPLEXER responsive to a pair of data inputs from each of the AINS ENGINES. Each data paid from an ENGINE includes the blended navigational solution for that engine along with the horizontal residual computed by the engine. The Inertial Heading Array block 218 couples a predetermined selection of initial indexed heading $\psi_k$ angles to the array of AINS ENGINES. The output of each of the AINS ENGINES 200, 202, 204 is a blended navigational solution. However the selection of the correct initial indexed heading $\psi_k$ for use as Ak results in the most accurate blended navigation solution. The MULTIPLEXER 220 is a hardware or program and computer function organized to examine the magnitude of each of the horizontal residual inputs and to select the blended navigational solutions and its respective AINS ENGINE having the smallest or minimum value of the sum of horizontal residuals accumulated during the N seconds of initial motion. The multiplexer 220 is shown coupled to receive and record the outputs of each respective AINS engine and to output only the blended navigational solutions output of the AINS engine having been initialized with the indexed heading $\psi_k$ closest in value to the $A_k$. The residuals are received by the MULTIPLEXER 220 and the selection of the minimum value residuals is made by the MULTIPLEXER.

Figure 6A:
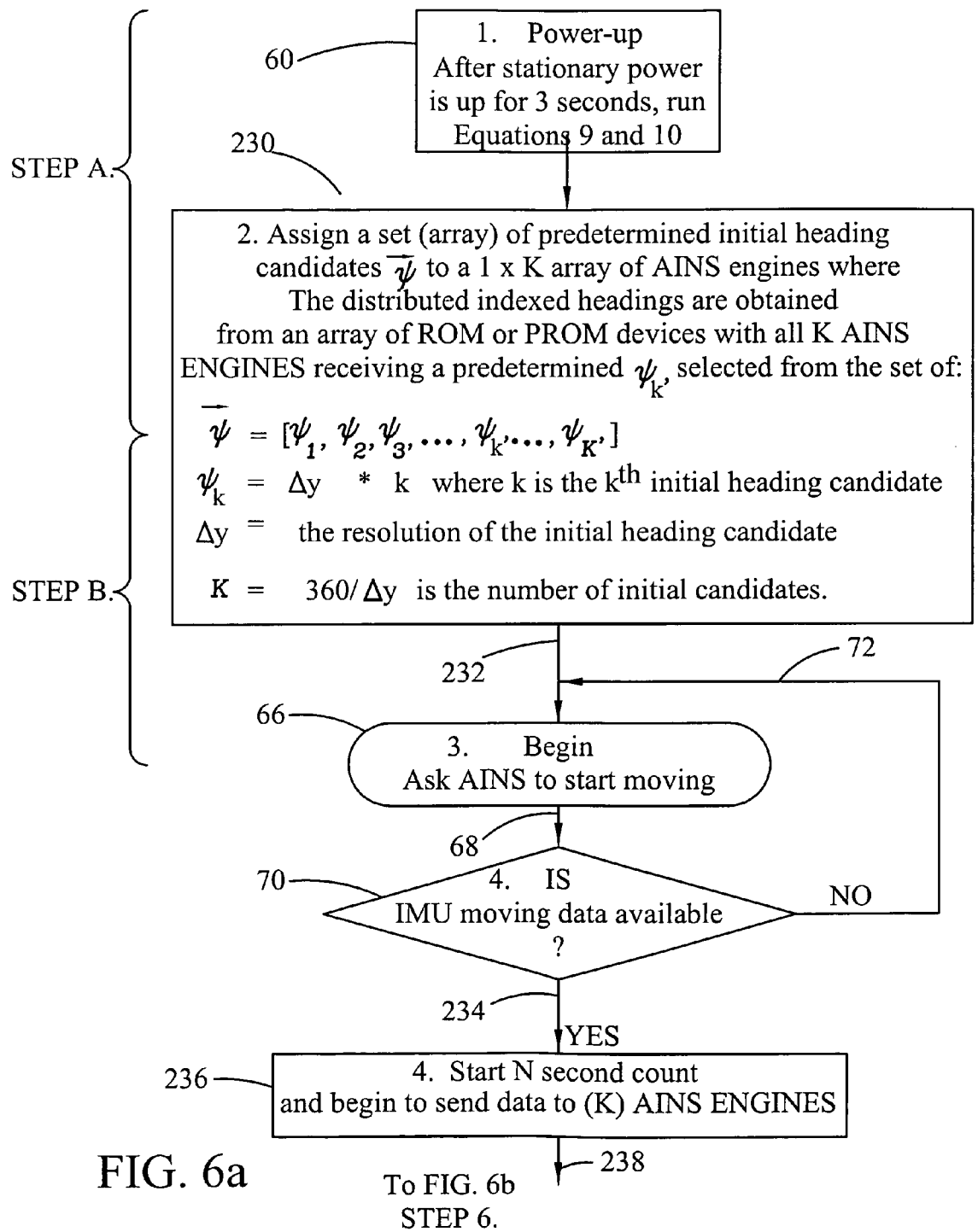
FIG. 6a and FIG. 6b form a flowchart characterizing the method or process for calculating $A_k$ with parallel calculations, the AINS using an array of AINS ENGINES and an Initial Heading Program to process data and calculate residuals as data is gathered.
Figure 6B:
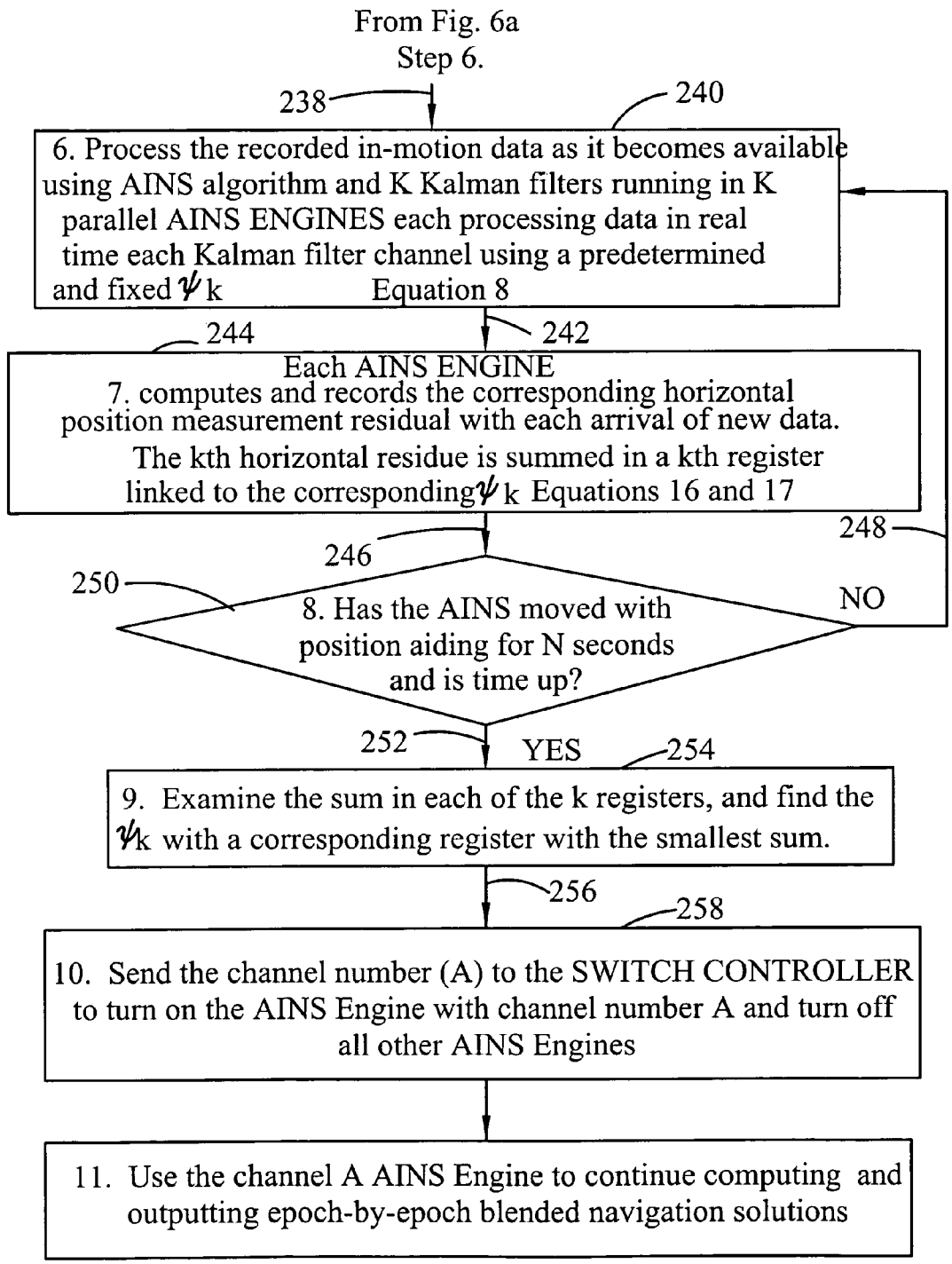

FIGS. 6a and 6b Flow Charts characterize the operation of a system for determining $A_k$ (a best initial heading estimate), with parallel computing. Blocks 60 (step 1) is the Power-up block and is functionally identical with block 60 on FIG. 5a. A few seconds after power-up, the system of FIG. 6a advances to block 230. Block 230 initializes every AINS ENGINE with its own respective value of an indexed heading $\psi_k$ characterizing a predetermined heading selected from a circular set of K indexed headings extending in a uniform spaced relation sequence from a first to a Kth or last indexed heading where K=360/$\Delta$y and where $\Delta$y is the number of degrees between each respective indexed heading $\psi_k$. For a five degree $\Delta$y, seventy two separate AINS ENGINES would be mechanized. It should be appreciated that if this embodiment were to be used in an aircraft that was typically pointed into a given quadrant, such as between zero and ninety or some other angle, for start ups and alignment, while stationed at a base of operation over a long duration, the AINS programs could be adapted to the reduced range from 360 degrees to the smaller range of zero to ninety with a single initialization and that could result in a reduction of the required AINS engine count by a factor of four with values of $\psi_k$ separated by only five degrees being used for the smaller zero to ninety degree commitment.

Block 230 (step 2.) duplicates the function of block 220 shown on FIG. 4. The process of FIG. 6a then advances to blocks 66 (step 3.) and 70 (step 4.) during which the system directs the operator to start moving and confirms when the system is moving. Blocks 66 and 70 are identical counterparts to those like numbered blocks shown on FIG. 5a. The description of the same blocks on FIG. 5a is the same for same blocks on FIG. 6a. The system then advances via path 234 to block 236 (step 5.).

Block 236 is a counter or time measuring function that measures the number of seconds during which data is received or it measures the number of GNSS position samples received at a periodic rate. Once the count is started, the system advances via path 238 (step 6.) to receive in-motion data at the system iteration rate (typically 50-100 times a second) and uses the AINS algorithm to continue to update the state of the system as to its position, and velocity in each of the k AINS computers or AINS ENGINES. The AINS computer advances via path 242 to block 244 (step 7.). Each AINS ENGINE continues to receive position aiding data from the GNSS and has available the continually updated state data from block 240 to calculate K sets of respective horizontal position residue data with the arrival of each new position aiding data. At this point, the system could elect to proceed with the AINS ENGINE and its respective heading estimate that has the minimum horizontal position residue data.

However, an alternative approach is to save the sum of each of the horizontal position residue data added to a respective reserved kth register associated with the respective kth indexed heading. The AINS ENGINE that had been assigned an indexed heading closest to the actual best indexed heading will shortly have a lowest sum and the lowest or minimum sum will point to the $A_k$ (a best initial heading estimate angle) for later use by an AINS at the end of the N count of block 236 (step 5.) and for use in further aligning and gyro-compassing. It should also be possible to process sum data for rate of change and within a very short N count, reduce the number of required AINS ENGINES to a smaller number of engines with a high likelihood of being one of those initialized with a value of indexed heading $\psi_k$ close to the value of $A_k$.

Block 244 characterizes the computation of a single horizontal position measurement residual computation and update. The system is shown advancing via path 246 to block 250 where the system determines if N counts have been completed. If the count is less than N seconds, the system returns via path 248 to block 240 and repeats steps 6 and 7 until the N seconds count of block 236 reaches the predetermined and required N seconds. After completing N cycles, the system advances via path 252 to block 254 (step 9.) where the system examines the sums in the K registers to find the lowest sum, and thereby determines the AINS ENGINE and its corresponding $A_k$ (a best initial heading estimate angle) for later use by the AINS over the N count interval. The system then advances via path 256 to block 258 (step 10.). The function of step 10 can be performed by conventional software or hardware.

The function of MULTIPLEXER 220, shown in FIG. 4, is to determine which of the AINS ENGINES has produced the smallest horizontal residue or sum of horizontal residues. The mechanization of the function either by hardware or by software running in a computer or shared computer (not shown) is a design choice within the skill of one in the art. The MULTIPLEXER 220 can be the location of the circuitry and or software. The alignment program sends is running within the AINS ENGINE computer and on completion of the selection of the AINS ENGINE with the smallest horizontal residual, the alignment program sends a signal to a switch controller 221 to turn off all of the AINS ENGINES but the AINS engine that has the smallest horizontal residues. The AINS engine that had been by chance assigned the value of $\psi_k$ closest to the actual value of $A_k$ at the instant that the system was powered up will be the AINS engine with the smallest residuals. By way of example, if the "A" AINS engine produces the smallest sum of horizontal residuals and if the "A" AINS ENGINE was assigned the number A as $\psi_k$ at power up where $\psi_k$ was closest to the actual value of $A_k$, AINS engine A will be allowed to remain ON and the switch controller 221 will be used to turn off all other AINS ENGINES. The system then continues to use AINS ENGINE A with the value of the $A_k$ input value set equal to A to continue computing and outputting epoch-by-epoch blended navigation solutions. The switch controller is shown coupled to interrupt the operation of all AINS ENGINES, but the AINS ENGINE providing the smallest horizontal residuals remains in operation.

In the parallel computational embodiment of FIGS. 2, 4 and 6a, 6b and it mechanizes an initial heading program to run in each of the AINS engine computers and if the program in the computers, either individually or jointly, is further characterized to provide the MULTIPLEXER 220 function by way of a sub-program (not shown), the MULTIPLEXER function 220 will receive time indexed horizontal position residue and blended navigation solution data pairs from each AINS engine in AINS computers 210-216 or from memories {ROM or RAM) within such computers. The MULTIPLEXER 220 function sums the time indexed horizontal position residues from each respective AINS engine in k corresponding registers during the N second interval movement of the AINS after power up and after a predetermined time interval of N seconds. In the present subprogram mechanization, the subprogram would create respective sums of the horizontal residue streams from each of the k AINS ENGINES. The multiplexer function subprogram would examine the sum or total in each of the k respective registers and identify the initial heading and the corresponding AINS engine that generated a smallest sum of time indexed horizontal position residues.

When an initial heading program running in the AINS computer including the multiplexer sub program(s) have identified the AINS engine that generated the smallest sum of time indexed horizontal position residues, the multiplexer 220 signals the switch controller 221 of the decision and couples the outputs all past blended navigation solutions calculated before the Nth second from the AINS computer memory (ROM or RAM) from the identified AINS engine to the user system for reprocessing along with updated Euler angles and velocities for use during the subsequent fine alignment. Subsequent to the identification, the multiplexer also transfers all future blended navigational solutions from the identified AINS engine to the user system. After the Nth second, the multiplexer 220 function provides a signal to the switch controller 221 to interrupt the operation of all AINS ENGINES except the identified AINS engine that produced the smallest horizontal residual sum.

AINS Kalman Filter

The Kalman filter is a recursive minimum-variance estimation algorithm that computes an estimate of a state vector based on constructed measurements. The generic discrete Kalman filter equations are listed as follow:

$$\hat{\vec{x}}_k^- = \Phi_{k,k-1}\hat{\vec{x}}_{k-1}^+ \tag{1}$$

$$P_k^- = \Phi_{k,k-1}P_{k-1}^+\Phi_{k,k-1}^T + Q_{k-1} \tag{2}$$

$$K_k = P_k^- H_k^T (H_k P_k^- H_k^T + R_k)^{-1} \tag{3}$$

$$\vec{\xi}_k = \vec{z}_k - H_k \hat{\vec{x}}_k^- \tag{4}$$

-continued $$\hat{\vec{x}}_k^+ = \hat{\vec{x}}_k^- + K_k \vec{\xi}_k \tag{5}$$

$$P_k^+ = (I - K_k H_k) P_k^- \tag{6}$$

where $$\hat{\vec{x}}_k^-, \hat{\vec{x}}_{k-1}^-$$

are the priori process state vectors at iteration k and k−1, respectively;

$$\hat{\vec{x}}_k^+, \hat{\vec{x}}_{k-1}^+$$

are the posteriori process state vectors at iteration k and k−1, respectively;

$\Phi_{k,k-1}$ is the transition matrix relating $$\hat{\vec{x}}_{k-1}^+ \text{ to } \hat{\vec{x}}_k^-;$$

$P_k^-$ is the priori error covariance matrix of the process state at iteration k;

$P_k^+$, $P_{k-1}^+$ are the posteriori error covariance matrix of the process state at iteration k and k−1, respectively;

$Q_{k-1}$ is the process noise covariance matrix at iteration k−1;

$K_k$ is the optimal Kalman gain matrix at iteration k;

$H_k$ is the design matrix giving the noiseless connection between the measurement and the process state vector at iteration k;

$R_k$ is the measurement noise covariance matrix at iteration k;

$\vec{\xi}_k$ is the measurement residual vector at iteration k; and $\vec{z}_k$ is the measurement vector at iteration k.

Equation (1) extrapolates the priori process state at iteration k from the posteriori process state at iteration k−1 based on a linear system dynamics model. Equation (2) extrapolates the priori process error covariance at iteration k from the posteriori process error covariance at iteration k−1 based on a linear system dynamics model and the process noise covariance. Equation (3) and Equation (4) computes the optimal Kalman gain and measurement residual which are used in Equation (5) and Equation (6) to update the posteriori process state and error covariance at iteration k by optimally blending the measurement and priori process state information in the sense of minimum-variance estimation error.

The AINS Kalman filter implements a linear model for the INS and aiding sensor errors. In some AINS implementations, the AINS Kalman filter implements a large azimuth INS error model called extended psi-angle error model when the azimuth error uncertainty exceeds a large azimuth error threshold, and a small INS error model called psi-angle error model when the azimuth error is less than the large azimuth error threshold. The extended psi-angle error model and psi-angle error model are listed in Equation (7) and Equation (8) below, respectively:

Extended PSI-Angle Error Model $$\delta \dot{\vec{r}}^c = -\vec{\rho}^c \times \delta \vec{r}^c + \delta \vec{v} + (\vec{v}^c \times)_{e+} \vec{\psi}_e + \vec{\eta}_{\delta r} \quad (7)$$

$$\delta \dot{\vec{v}} = \delta \vec{f}^p + \delta \vec{g}^c - \hat{\vec{g}} \times \vec{\psi} - (2\vec{\Omega}^c + \vec{\rho}^c) \times \delta \vec{v} - \vec{v}^c \times (\vec{\Omega}^c + \vec{\psi}) +$$

$$\vec{v}^c \times \vec{\varepsilon}^p + \begin{bmatrix} (\Omega_y^c + \rho_y^c)v_y & -(\Omega_x^c + \rho_x^c)v_y & 0 & \Omega_y^c v_z \\ -(\Omega_y^c + \rho_y^c)v_x & (\Omega_x^c + \rho_x^c)v_x & 0 & -\Omega_x^c v_z \\ 0 & 0 & 0 & -(3\Omega_x^c + 2\rho_x^c)v_y + (3\Omega_y^c + 2\rho_y^c)v_x \end{bmatrix} \vec{\psi}_e$$

$$\dot{\vec{\psi}}_e = \begin{bmatrix} -(\vec{\omega}_{ic}^c \times)_{e+} \\ 0 \end{bmatrix} \vec{\psi}_e - \begin{bmatrix} \vec{\varepsilon}^p \\ 0 \end{bmatrix}$$

PSI-Angle Error Model $$\delta \dot{\vec{r}}^c = -\vec{\rho}^c \times \delta \vec{r}^c + \delta \vec{v} + \vec{v} \times \vec{\psi}$$

$$\delta \dot{\vec{v}} = \delta \vec{f}^p + \delta \vec{g}^c - \hat{\vec{g}} \times \vec{\psi} - (2\vec{\Omega}^c + \vec{\rho}^c) \times \delta \vec{v} - \vec{v} \times (\vec{\Omega}^c \times \vec{\psi}) + \vec{v} \times \vec{\varepsilon}^p$$

$$\dot{\vec{\psi}} = -\vec{\psi}_{ic}^c \times \vec{\psi} - \vec{\varepsilon}^p \quad (8)$$

where $\delta \vec{r}^c$ denotes the inertial position error vector resolved in the computer frame;

$\delta \vec{v}$ denotes the inertial velocity error vector resolved in the computer frame;

$\vec{\psi}$ denotes the computer to platform frame misalignment vector resolved in the platform frame;

$\vec{\varepsilon}^p$ denotes the vector of gyro errors resolved in the platform frame;

$\delta \vec{f}^p$ denotes the vector of accelerometer errors resolved in the platform frame;

$\delta \vec{g}^c$ denotes the gravity error due to the miss-resolution of gravity by the tilted computer frame;

$\hat{\vec{g}}$ denotes the computed gravity vector resolved in the computer frame;

$\vec{v}$ denotes the best estimate of true velocity resolved in the computer frame;

$\vec{\rho}^c$ denotes the transport rate of the computer frame resolved in the computer frame;

$\vec{\Omega}^c$ denotes the earth rate resolved in the computer frame; and $\vec{\psi}_{ic}^c = \vec{\Omega}^c + \vec{\rho}^c$ denotes the sum of the computer frame transport rate and earth rate resolved in the computer frame.

The extended psi-angle error model (7) uses an extended misalignment vector $\vec{\psi}_e = [\psi_x \ \psi_y \ \sin \psi_z \ \cos \psi_z - 1]^T$ which has two states modeling the sine and cosine of heading error or a related quantity such as wander angle error.

The psi-angle error model (8) is used in this invention. The psi-angle error model (8) uses a misalignment vector $\vec{\psi} = [\psi_x \ \psi_y \ \psi_z]^T$ which has one state modeling the heading error on the assumption that the cosine of the heading error approximates to one and the sine of the heading error approximates to the heading error. This assumption is valid for heading error in the range 10 degrees or less. The detailed descriptions and derivations of the models are shown in B. M. Scherzinger, "Inertial navigator error models for large heading uncertainty," in Proc. Int. Symp. Kinematic Systems in Geodesy, Geomatics and Navigation, Banff, Canada, Aug. 30-Sep. 2, 1994, pp. 121-130.

INS Alignment

An INS is a dead-reckoning navigation system which requires initial position, velocity and orientation information to compute a navigation solution. The initial position and velocity are typically obtained from an aiding position fix sensor such as a GPS receiver. The initial orientation (roll, pitch and heading) is typically determined by INS alignment. INS alignment can be performed either when the IMU is at rest on the ground or in motion.

Ground Alignment

Ground alignment is an alignment approach performed when the IMU is at rest on the ground. Ground alignment consists of a tilt determination procedure using accelerometer leveling and a heading determination procedure using gyro-compassing or external heading sensors. The accelerometer leveling is based on the fact that the averaged specific force vector sensed by the IMU comprises the gravity vector when the IMU is stationary. The IMU roll $\phi$ and pitch $\theta$ can be computed by projecting the averaged specific force vector onto this apparent vertical reference using the following Equations.

$$\phi = -\sin^{-1}\left(\frac{f_y}{g}\right) \quad (9)$$

$$\theta = \sin^{-1}\left(\frac{f_x}{g}\right) \quad (10)$$

where fx and fy are the x-axis and y-axis averaged specific force, respectively. g is the gravitational constant.

The accuracy of the estimated roll and pitch is dominated by the accelerometer biases. A 1 mg accelerometer bias will result in around 0.057 degree tilt error.

Gyro-compassing is based on the fact that the angular rate vector sensed by the IMU comprises the Earth's rotation rate $\omega_e$ when the IMU is stationary. When the IMU is located at a latitude of L with a heading of $\psi$, the Earth's rotation rates projected onto the local level horizontal plane axes, $\omega_{hx}$ and $\omega_{hy}$, are:

$$\omega_{hx} = \omega_e \cos L \cos \psi \quad (11)$$

$$\omega_{hy} = \omega_e \cos L \sin \psi \quad (12)$$

By taking the ratio of the Equation (12) over Equation (11), the heading information can be computed as follows:

$$\psi = \tan^{-1}\left(\frac{\omega_{hy}}{\omega_{hx}}\right) \quad (13)$$

$\omega_{hx}$ and $\omega_{hy}$ can be derived from projecting the angular rate vector sensed by the IMU onto the horizontal plane using the pitch and roll estimates obtained from the accelerometer leveling. The accuracy of a gyro-compassed heading is proportional to the quality of the gyro measurements and the square root of the alignment time. In general, gyro-compassing requires highly accurate gyroscopes and long alignment times. The heading error achieved after 10 minutes with an IMU containing 1-degree/hour gyroscopes at 45 degrees latitude is around 6 degrees. To achieve a gyro-compassed heading of 0.1 degrees, the gyroscopes must have 0.01 degrees/hour or less. Such gyros are highly expensive navigation grade gyros.

The initial heading can also be determined by using external heading sensors such as magnetic compass or multi-antenna GNSS-based attitude determination system. However, the utilization of external heading sensors can have disadvantages. The magnetic compass is affected by magnetic disturbance and local magnetic fields. It requires special attention on sensor calibration and installation. The multi-antenna GNSS-based attitude determination system is expensive and the GNSS antennas must be separated by as large a distance as possible, which prohibits its use in small vehicle or pedestrian navigation applications.

In-Motion Alignment

In-motion alignment is an alignment approach performed when the IMU is in motion. The in-motion alignment method arbitrarily assigns the initial attitude of the IMU typically to zero degrees roll, pitch and heading, and uses the AINS Kalman filter to estimate the attitude errors with the aiding from an external velocity and/or position reference source such as a GNSS receiver. The Kalman filter's estimated roll and pitch errors will converge quickly regardless of IMU dynamics when position and velocity aiding data are available to the Kalman filter. The AINS Kalman filter typically implements the extended psi-angle error model when the heading error uncertainty is larger than 10 degrees and the psi-angle error model when the heading error uncertainty is 10 degrees or less. The reason for switching error models is that the extended psi-angle error model ignores some rather large nonlinear components in order to implement a linear stochastic model, and hence is inaccurate for modeling small INS errors. Hereafter the Kalman filter implementing the extended psi-angle error model refers to KF-A and the psi-angle error model refers to KF-B. The KF-A's estimated heading error will converge quickly if the IMU undergoes maneuvers that enhance the Kalman filter's observability of heading error. In stationary alignments, the KF-A implements the equivalent of gyro-compassing alignment. For airborne or land vehicle applications, about 1 minute alignment convergence time is typically achievable if the vehicle executes rapid turns that generate large centripetal accelerations. For man-portable mobile applications, where the dynamics experienced are smaller, in-motion alignment requires a long and possibly unacceptable convergence time. After the estimated heading error converges to a small value, typically 10 degrees, the AINS reaches a fine alignment state and then uses the KF-B to provide fine align navigation solutions.

AINS Short-Term Error Analysis

The AINS navigation solution is a blend of INS and aiding sensor navigation solutions. The AINS position error is a function of aiding sensor position errors, initial alignment errors, and inertial sensor errors. Considering the initial position and velocity are given by the aiding sensor and the aiding position accuracy is very consistent over short time intervals, the position residual between the aiding sensor and AINS solutions at the beginning of navigation can be assumed to be a function of initial heading and tilt errors and inertial sensor errors, primarily accelerometer and gyro biases. As mentioned in the previous section, the inertial navigator usually uses accelerometer leveling to estimate the tilt angle during initial stationary periods, and hence the initial tilt error is the ratio between initial horizontal accelerometer biases $b_{init}$ and local gravity. The initial tilt error will equal $-b_{init}/g$ so as to cancel the horizontal accelerometer bias. For example, an initial bias of 1 mg results in an initial tilt error of 1 millenarian. As the accelerometer biases can be considered nearly constant over short time intervals, in the first few seconds' navigation the horizontal accelerometer biases are assumed to equal to $b_{init}$ and therefore the initial tilt error cancels the effect of horizontal acceleration error on the position error. Thus, when the AINS moves, the position residual between the aiding sensor and AINS solutions is mainly generated by the initial heading error and gyro bias. This can be expressed by the following equation.

$$\Delta \vec{r} \approx f(\delta\psi_{init}, \delta\vec{\omega}^b) \quad (14)$$

where $\Delta \vec{r}$ denotes the position residual vector;

$f(\ )$ denotes a nonlinear function;

$\delta\psi_{init}$ denotes the initial heading error; and $\delta\vec{\omega}^b$ denote the gyro bias vector.

The position residual is equivalent to the position measurement residual computed by the AINS Kalman filter as the true positions cancel in the differences, so that the differences in the position errors remain. Equation (15) and Equation (16) show an example of the position measurement and position measurement residual when GPS North, East and Down position errors are used for the measurements in AINS KF-B. The reason for using KF-B here is that the KF-B implements a small azimuth INS error model and is more accurate for modeling small INS errors.

$$\vec{z}_{sgp} = \begin{bmatrix} r_N(\lambda_s - \lambda_G) \\ -r_E \cos\lambda_s(L_s - L_G) \\ -(h_s - h_G) \end{bmatrix} + C_r^g \vec{l}_{sG}^r \quad (15)$$

$$\Delta \vec{r} \cong \vec{\xi} = \begin{bmatrix} \xi_N \\ \xi_E \\ \xi_D \end{bmatrix} \quad (16)$$

$$= \begin{bmatrix} r_N(\lambda_s - \lambda_G) \\ -r_E \cos\lambda_s(L_s - L_G) \\ -(h_s - h_G) \end{bmatrix} +$$

$$C_r^g \vec{l}_{sG}^r - C_w^g(\delta\vec{r}_s^w + (C_r^w \vec{l}_{sG}^r) \times \vec{\psi} + C_r^w \delta\vec{l}_{sG}^r)$$

where $\vec{z}_{sgp}$ denotes the position measurement vector;

$\lambda_s, \lambda_G$ denote the inertial reference and GPS latitude solutions;

$L_s, L_G$ denote the inertial reference and GPS longitude solutions;

$h_s, h_G$ denote the inertial reference and GPS altitude solutions;

$r_N, r_E$ denote the North and East radii of curvature at the current position;

$\vec{l}_{sG}^r$ denotes the IMU to GPS antenna lever arm resolved in the reference frame;

$C_r^g$ denotes the computed reference to geographic (NED) frame direction cosine matrix;

$C_w^g$ denotes the wander angle to geographic (NED) frame direction cosine matrix;

$\delta \vec{r}_s^w$ denotes the inertial position error vector resolved in the computed wander angle frame;

$C_r^w$ denotes the computed reference to wander angle frame direction cosine matrix;

$\vec{\psi}$ denotes the computer to platform frame misalignment vector as defined in the psi-angle error model; and $\delta \vec{l}_{sG}^r$ denotes the IMU to GPS antenna lever arm error.

Considering the horizontal channel only, the following Equation is developed to quantify the relationship between the horizontal position measurement residual and the initial heading error and gyro bias.

$$\xi_H = \sqrt{(\xi_N)^2 + (\xi_E)^2} \cong \delta\psi_{init} Vt + \frac{1}{6}\|\delta\vec{\omega}^b\|gt^3 \quad (17)$$

where $\xi_H$ denotes the AINS Kalman filter horizontal position measurement residual;

V denotes the speed of the AINS experienced;

$\|\delta\vec{\omega}^b\|$ denotes the magnitude of the gyro bias;

g denotes the gravitational constant; and t denotes the dead-reckoning time.

For pedestrian applications with a typical walking speed of 3 km/hr, the horizontal position measurement residual generated by 1 degree initial heading error in one second dead-reckoning is 0.01454 meter which equals to the amount generated by 0.51 degree/second gyro bias. If a tactical grade IMU with gyro bias at 0.002 degree/second level is used, the horizontal position measurement residual is mainly generated by the 1 degree initial heading error. In this case, the more accurate the initial heading assigned to the AINS, the less the horizontal position measurement residual computed by the AINS KF-B using Equation (16) and Equation (17). This correlation provides a way to estimate the initial AINS heading accurately using the position residual computed by the AINS KF-B. If a commercial grade IMU with gyro biases on the order of 0.5 degrees/second is used, the horizontal position measurement residual contributed by the gyro bias (2nd term in Equation (17)) is now increased to a magnitude that rivals the horizontal position measurement residual contributed by 1 degree initial heading error (1st term in Equation (17)). According to Equation (17), the horizontal position measurement residual contributed by the initial heading error increases with the speed of the AINS during the dead-reckoning. For applications having large initial velocity such as on an aircraft or land vehicle, the horizontal position measurement residual is dominated by the initial heading error even when low grade gyros are used.

The step-by-step flowchart of the rapid aided INS alignment process and method illustrated in FIG. 5a and FIG. 5b shows that a priori data comprising the user-selected number of seconds N of in-motion navigation and the number of heading samples K starts in the beginning blocks of 60, 66, 70, 76 and 80. The required processing time and the achievable initial heading estimation accuracy of the method mainly depend on the number of heading samples K. A smaller number of heading samples provides a faster but less accurate solution, whereas a larger number of heading samples provides a more accurate but slower solution. Also, in FIG. 5b, the term "horizontal position measurement residual norm" refers to the expression in equation 17 in which the equation $\xi_H = \sqrt{(\xi_N)^2 + (\xi_E)^2}$ appears and for which there can be maximum and minimum positive values as its components vary in magnitude. The value is always positive because the individual components are squared and positive. The expression "horizontal position measurement residuals value" may appear as an equivalent to "horizontal position measurement residuals". The term "time indexed" means that the following term is marked with a real time identification as a data item or as a field item in a record of fields.

While certain specific relationships, functions, steps, materials and other parameters have been detailed in the above description of the preferred embodiments, those can be varied, where suitable, with similar results. Other applications and variations and sequences of steps and organizations of stored and recorded data of the present invention will occur to those skilled in the art upon reading the present disclosure. Those variations are also intended to be included within the scope of this invention as defined in the appended claims.

APPENDIX

References

[1] George Siouris, Aerospace Avionics Systems, A Modern Synthesis, Academic Press 1993.
[2] B. M. Scherzinger, "Inertial navigator error models for large heading uncertainty," in Proc. Int. Symp. Kinematic Systems in Geodesy, Geomatics and Navigation, Banff, Canada, Aug. 30-Sep. 2, 1994, pp. 121-130.
[3] U.S. Pat. No. 4,930,085 May/1990 Kleinschmidt, Method for determining the heading of an aircraft, 364/449
[4] U.S. Pat. No. 5,406,489 April/1995 Timothy et al., Instrument for measuring an aircraft's roll, pitch, and heading by matching position changes along two sets of axes, 364/434

Acronym Glossary
AINS Aided Inertial Navigation System
DMI Distance Measuring Indicator
GNSS Global Navigation Satellite System
GPS Global Positioning System
IMU Inertial Measurement Unit
NS Inertial Navigation System
MEMS Micro-Electro-Mechanical Systems
NED North-East-Down

What is claimed is:

1. A method for determining $A_k$ (a best initial heading estimate) using serial computing for use with an alignment program running in an AINS (aided INS) computer in an AINS system, the method comprising the steps of:

A. powering up the AINS system, requesting movement of the AINS system and acknowledging movement when AINS system is moving, B. receiving and recording N (a predetermined number of) time indexed records, each record having a corresponding sub-set of time indexed aiding position data values and a corresponding sub-sets of time indexed in-motion data values in a first array, and advancing to step C as the Nth (last) time indexed record is recorded in the first array, C. assigning a value to an indexed heading $\psi_k$, D. selecting a record from the first array and using the assigned value of the indexed heading $\psi_k$ and the AINS algorithm calculating and recording an update for the position data, E. calculating and recording a time indexed horizontal position measurement residual using record from the first array and the value of the indexed heading $\psi_k$ in a second array, F. testing to see if all N records in the first array have been processed and if there are records in the first array that have not been processed, return to step D and E and if all N records in the first array have been processed then advance to step G, G. selecting the maximum horizontal position measurement residual norm from those saved in the second array and the corresponding $\psi_k$ in a third array, and advance to step H, H. test to see if $\psi_k$ is equal to 360 degrees and if not, return to step C, increment the value of $\psi_k$ and repeat steps D, E, F, G and if $\psi_k$ equals 360 degrees, advance to step I, I. identifying the smallest maximum horizontal position measurement residual norm over the recorded maximum horizontal position measurement residual norms in the third array and designate the initial heading corresponding to the smallest horizontal position measurement residual norm in the third array as $A_k$ for subsequent use in alignment.

2. The method of claim 1 at step B wherein the second sub-set time indexed in-motion data values received from the IMU further comprise:
a sequence of time indexed incremental Euler angles (pitch, roll and azimuth) and platform velocities from the IMU between each timed indexed aiding position data value.

3. The method of claim 1, wherein step C is amended to have $\psi_k$ set to a value equal to $\Delta y$ times k where $\Delta y$ is a heading increment assigned by the user and k is $360/\Delta y$.

4. The method of claim 1 wherein step E further comprises the step of calculating and recording
a time indexed horizontal position measurement residual values using $\psi_k$ for each corresponding time indexed present position value in the first array using
an AINS Kalman filter horizontal position measurement residual computation process.

5. The method of claim 1 wherein step H is further characterized as comprising:
determining if index k=K where K is a predetermined constant characterized to prevent $\psi_k$ from exceeding 360 degrees, and if not, return to added step C, and if k=K, advancing to step I.

6. A method for determining $A_k$ (a best initial heading estimate) for use with an alignment program running in an AINS (aided INS) computer in an AINS system using serial computing, the method comprising the steps of:

A. moving the AINS system during a filter interval,

B. recording N pairs of GNSS position data and INS in-motion data as N records in a first array, C. assigning a corresponding indexed heading $\psi_k$ characterizes a predetermined indexed heading selected from a circular set of K indexed headings extending in uniform spaced relation sequence from a first indexed heading to the last indexed heading, D. processing each of the N records in the first array with the indexed heading $\psi_k$ to obtain N horizontal position measurement residuals and saving each of the respective N horizontal position measurement residuals with its corresponding indexed heading in a second array, E. selecting the maximum value horizontal position measurement residual from the N horizontal position measurement residuals in the second array and save it with its corresponding index heading $\psi_k$ in a third array, F. select the next indexed heading and if the next indexed heading is not the last indexed heading, return to step C and re-execute steps C, D, E, and F and if the next indexed heading is the last indexed heading, advance to step G and perform step G, G. identify the smallest horizontal position measurement residuals from the recorded maximum horizontal position measurement residuals in the third array and select the corresponding value of $\psi_k$ in the third array as $A_k$, for use in the alignment program.

7. The method of claim 6 wherein the INS in-motion data further comprises:
a sequence of time indexed incremental Euler angles and platform velocities as state components of the in-motion data values in a second array.

8. The method of claim 6 wherein step C is further characterized to have indexed heading $\psi_k = \Delta\psi \times k$, with k being a stepped index value in a range of from one through a constant K, the step size of $\Delta\psi$ and the value of K being characterized to restrict the value of indexed $\psi_k$ to be less than 360 degrees.

9. The method of claim 6 wherein step D is further characterized to require that an AINS Kalman filter position measurement residual computation process and a horizontal position measurement residual computation process be used.

10. A system for determining $A_k$ (a best initial heading estimate), running in an AINS (aided INS) computer in an AINS system using parallel computing, the system comprising:
an IMU coupled to
the AINS computer, the IMU being coupled to provide INS data to
a data bus from
a triax of accelerometers and data from
a triax of rate gyros,
an array of AINS engine computers coupled to the data bus to be responsive to the INS data, each AINS engine computer having
an alignment program initialized with an indexed heading $\psi_k$ characterizing a predetermined heading selected from a circular set of K indexed headings extending in a uniform spaced relation sequence from a first to a Kth or last indexed heading,
a GNSS for providing position data to the data bus,
each AINS engine computer being coupled to the data buss, the alignment program running in each respective AINS engine being, responsive to the INS data from the IMU, the position data from the GNSS the alignment program being further characterized to provide a series of time indexed horizontal position measurement residues in response to movement of the AINS,
a kth AINS engine producing the smallest sum of horizontal position measurement residuals being identified as the AINS engine having been initialized with an indexed heading $\psi_k$ closest in value to the $A_k$, best initial heading estimate.

11. The system for determining $A_k$ of claim 10 further comprising:
a multiplexer, the multiplexer being coupled to receive and record the outputs of each respective AINS engine and to output only the output of the AINS engine having been initialized with an indexed heading $\psi_k$ closest in value to the $A_k$.

12. The system for determining $A_k$ of claim 11 further comprising:
a switch controller coupled to interrupt the operation of all AINS ENGINES, but the AINS engine providing the smallest horizontal position measurement residuals.

13. The system for determining $A_k$ of claim 12 wherein:

the switch controller is further characterized to be responsive to an output from the multiplexer to select the AINS engine providing the smallest horizontal position measurement residuals.

14. The system for determining $A_k$ of claim 11 wherein the initial heading program running in the AINS computer is further characterized as having a multiplexer function, the multiplexer function receiving time indexed horizontal position measurement residuals and blended navigation solution data pairs from each AINS engine in an AINS computer memory {ROM or RAM), the multiplexer function sums the time indexed horizontal position residues from each respective AINS engine in "k" corresponding registers during movement of the AINS after power up and after a predetermined time interval of N seconds, the multiplexer scans the sums of the horizontal position measurement residuals in each of the k respective registers and identifies the initial heading and the corresponding AINS engine that generated a smallest sum of time indexed horizontal position measurement residuals.

15. The system for determining $A_k$ of claim 14 wherein after the initial heading program running in the AINS computer has identified the AINS engine that generated the smallest sum of time indexed horizontal position measurement residuals, the multiplexer outputs all blended navigation solutions calculated after the Nth second from the AINS computer memory (ROM or RAM).

16. The system for determining $A_k$ of claim 14 wherein after the initial heading program running in the AINS computer has identified the AINS engine that generated the smallest sum of time indexed horizontal position measurement residuals, the multiplexer outputs all blended navigation solutions calculated before the Nth second from the AINS computer memory (ROM or RAM).

17. The system for determining $A_k$ of claim 15 wherein after the Nth second, the multiplexer provides a signal to the switch controller to interrupt the operation of all AINS ENGINES except the identified AINS engine that produced the smallest horizontal position measurement residuals sum.

18. The system for determining $A_k$ of claim 16 wherein after the Nth second, the multiplexer provides a signal to the switch controller to interrupt the operation of all AINS ENGINES except the identified AINS engine that produced the smallest horizontal position measurement residuals sum.

19. The system for determining $A_k$ of claim 10 wherein each AINS engine further comprises:

a dedicated inertial navigator computer, coupled to the data bus to be responsive to data from the IMU, a dedicated error controller coupled to exchange data with the Kalman filter and to provide correction data to the inertial navigator computer, and a Kalman filter coupled to receive GNSS position data from the GNSS and to be initialized with $A_k$ from the initial heading program.

* * * * *